Nov. 19, 1940.   R. ALKAN   2,221,748
AUTOMATIC PILOT DEVICE
Filed Feb. 1, 1939   3 Sheets-Sheet 1

Inventor.
Robert Alkan
by
Stephen Cerstvik
Atty.

Nov. 19, 1940. R. ALKAN 2,221,748
AUTOMATIC PILOT DEVICE
Filed Feb. 1, 1939 3 Sheets-Sheet 3

Inventor:
Robert Alkan
by
Stephen Cerstvik
Atty.

UNITED STATES PATENT OFFICE 2,221,748

AUTOMATIC PILOT DEVICE

Robert Alkan, Paris, France

Application February 1, 1939, Serial No. 254,124
In France February 1, 1938

14 Claims. (Cl. 244—77)

The present invention relates to automatic pilot devices and more particularly to automatic pilot devices intended for use in aircraft.

One of the objects of the invention is to provide a novel system or means for the joint control of a directional steering device and a lateral stabilizing control device so that a correct angle of bank is automatically imparted to the craft upon turning movements imposed on the latter for desired changes in heading.

The applicant's prior patent application Serial No. 223,776, filed August 8, 1938, discloses an automatic pilot device of the above kind more particularly intended for use on aircraft. It has been there suggested to use a differential gear mechanism between a controlling element, such as a gyroscope, giving a direction or position of reference about a given axis and the sensitive element of a follow-up mechanism controlling power means actuating a corresponding control surface. Such provision has been made for each of the control devices of an aircraft, namely the directional control and lateral and longitudinal stability controls.

In the automatic pilot device of the above mentioned application, changes in the heading of a craft utilizing such a device were obtained by rotating an intermediary or planetary element of the differential gear mechanism in the directional steering control mechanism, by means of a control shaft which received by way of a manual control a rotation proportional to the angle of a desired change in heading. In such a device means were provided, whereby the aircraft was banked to a correct angle during turns imparted thereto for the desired changes in heading. This result was obtained by simultaneously controlling along with the differential gear mechanism in the automatic steering device, the intermediary element of the differential gear mechanism inserted in the automatic lateral stability control device, through the intermediary of a tachymetric mechanism, the deflection or response of which was proportional to the speed of turn or change in heading imparted to the craft.

For the purpose of explanation, let us indicate by $a$ the angle of bank of an aircraft during the turn, by $r$ the radius of turn, by $w$ the angular speed of turn of change in heading, by $v$ the speed of the craft on its trajectory, by $g$ the acceleration of gravity and by $C$ the change in heading, then the correct angle of bank of an aircraft during a turn is given by the following equation:

$$tga = \frac{w^2 r}{g} = \frac{wv}{g} = \frac{v}{g}\frac{dC}{dt} \quad (1)$$

The tangent of this angle of bank is thus proportional, for a constant value of speed $v$, to the derivative with respect to time of the change in heading. It is for this reason that in the prior application referred to above and in which the change in heading was controlled manually, a differentiating mechanism, namely a tachymeter, had been provided between the heading control and the lateral stability control.

Now, it is possible to imagine devices capable of resolving the above equation in the opposite sense and permitting to obtain a change in heading from a bank angle imparted to the craft. In accordance with the present invention it is preferred however, to adopt an intermediary solution between these two extremes and thus in this respect, the invention consists in the following desirable features:

One of the objects of the invention is to provide a novel device adapted to control changes in heading of an aircraft by applying an adjustable controlling action to the directional steering control mechanism through the intermediary of an automatic integrating device.

Another object of the invention is to provide novel means for controlling the lateral inclination or banking of an aircraft by applying an adjustable controlling action to the lateral stability control mechanism of the craft through the intermediary of an automatic computing device of arc-tangent.

A further object of the invention is to provide novel means for simultaneously applying a predetermined controlling action to both the integrating device associated with the directional steering control mechanism and to the computing device of arc-tangent associated with the lateral stability control mechanism.

Another object of the invention is to provide a novel integrating device comprising a gyroscope to which a predetermined amount of control may be applied for producing a precession.

A still further object of the invention is to provide novel means wherein the same gyroscope may be used as an element forming part of the directional steering control mechanism and also comprises a part of the integrating device.

Another object of the invention lies in making the computing device of arc-tangent adjustable and in effectively adjusting the parameters of said device in response to the speed of the craft on its trajectory.

A further object of the invention lies in making the integrating device adjustable and in effectively adjusting the parameters thereof in response to the speed of the craft on its trajectory.

And still another object of the invention lies in applying a controlling action from the computing device of arc-tangent to a differential gear mechanism inserted between the sensitive element of a follow-up mechanism in the lateral stability control mechanism and the gyroscopic indicator of the vertical or gyro-vertical, which serves as a reference element therefor.

Besides the above objects and features of the invention, an additional object resides in providing in an automatic pilot device utilizing a reference as a control axis for indicator actuating a sensitive control element of a follow-up mechanism which controls a power operation of the corresponding control surface, a novel connection between the reference indicator and the sensitive element of the follow-up mechanism, whereby the sensitive element may be disconnected from the reference indicator when a predetermined limit of travel to one or to another direction is attained.

The invention, therefore, has for its purpose the additional object of providing an automatically operable declutching mechanism between the gyroscope and the sensitive element of the follow-up mechanism controlled thereby.

Another object is to provide novel means for providing automatically operable means for returning the sensitive element of the follow-up mechanism to its medium position after the same is disconnected from the reference indicator such as a gyroscope.

A still further object is to provide novel means whereby causing an automatic and simultaneous actuation of the declutching mechanism and the means returning the sensitive element of the follow-up mechanism to its medium position is obtained, when the angle of deviation of this sensitive element approaches the limits imposed to the operation of the follow-up mechanism depending on the possible maximum deflection of the control surface.

The above and other objects and features of the invention will appear more fully hereinafter from the following detailed description and the enclosed drawings showing several embodiments of the invention, it being expressly understood however, that the drawings are given for the purpose of illustration only and are not to be construed as a definition of the limits of the invention.

Figure 1:
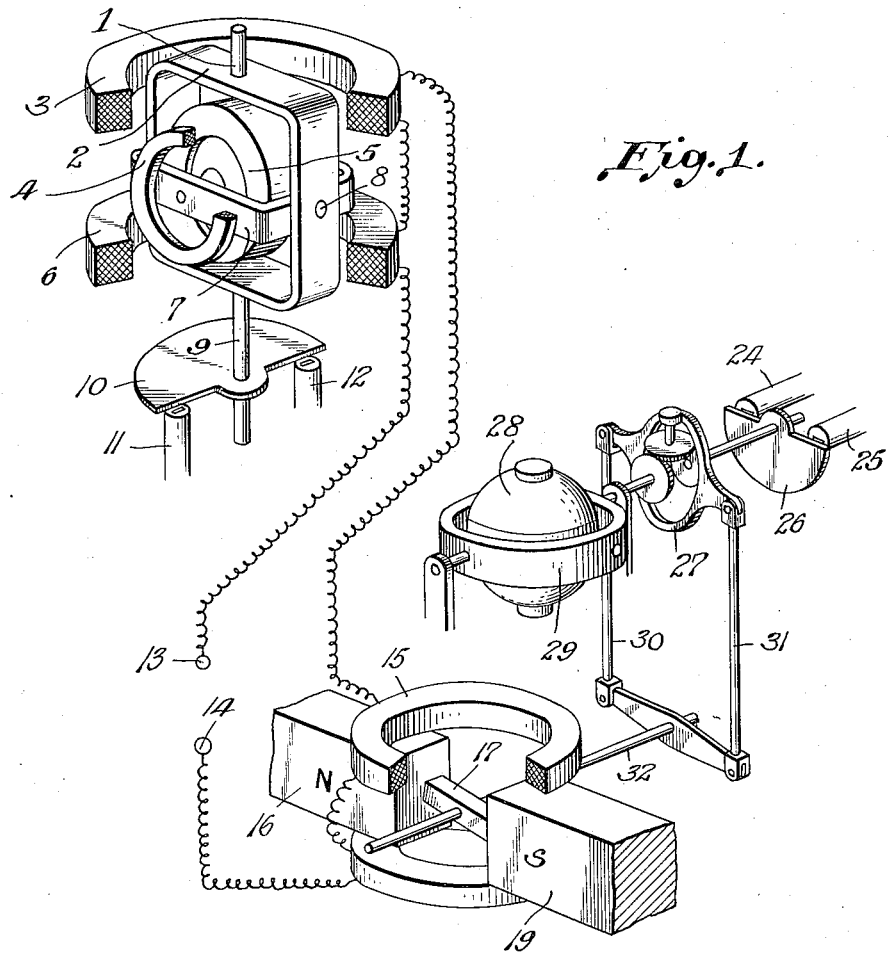
Figure 1 is a diagrammatic view, showing an embodiment of the invention based on electrical operation.

Referring to Fig. 1, this figure shows diagrammatically an embodiment of the invention applied to an automatic pilot mechanism of the type disclosed in the prior application mentioned above.

Thus, the system comprises an auomatic directional steering control device operated by a directional gyroscope. This gyroscope comprises as usual a gyroscopic rotor 5 mounted for rotation about an axis within a normally horizontal gimbal ring 7 pivoted about an axis 8 perpendicular to the spinning axis of the rotor 5 within an outer gimbal frame 2 journaled in the aircraft by means of two trunnions 1 and 9 about an axis parallel to the vertical axis of the craft. The spinning of the rotor 5 within the horizontal gimbal ring 7 may be produced by any known means, for instance by fluid pressure means or by electrical means.

The lower trunnion 9 of the vertical frame 2 carries at its extremity the sensitive or controlling element of the follow-up mechanism controlling the steering means (not shown) of the craft. In the example shown, the controlling element is constituted by a half-disc 10 adapted to control two orifices 11, 12 of a follow-up mechanism controlling an automatic steering system of the type shown in the prior application referred to above.

The inner gimbal ring 7 of the suspension of the gyroscope pivoted about axis 8 is provided with two coils 4 centered on the axis of rotation of the gyroscope 5 (only one of said coils being shown, the other being hidden by the rotor 5). These coils are normally traversed by an electric current $I_1$ of constant intensity, which, however, may be adjusted at will. This current may be conducted to coils 4 and 5, for instance, by the same leads which serve to energize the gyrorotor, if the same is electrically driven.

Surrounding the gyroscope and its Cardan ring suspension, there are provided preferably two fixed solenoid coils 3 and 6 centered on the vertical axis 1—9 of the vertical frame of the suspension of the gyroscope. By sending an electrical current $I_2$ through these solenoid coils, the intensity and direction of which depend on the movements it is desired to impart to the craft, there is developed between the field created by coils 4 and the field produced by coils 3 and 6, an electrodynamic torque proportional to the product of two currents, $I_1 \times I_2$, which exerts its action about the axis 8 to produce a precession of the gyroscope about the axis 1, the speed W of which is proportional to the torque. The resultant amplitude or change in heading C, will then be proportional to the integral of the same product with respect to time.

Supposing $I_1$ as constant, one has:

$$W = KI_1I_2 \text{ and } C = KI_1 \int_0^t I_2 dt \qquad (2)$$

According to the invention, this arrangement is to be associated with a galvanometric system. In one embodiment the galvanometric system may be constituted by means of a magnet the North and South poles of which 16, 19 are arranged to face each other and of a pair of coils 15, 18, which are centered on an axis perpendicular to the airgap of the magnet. The terminal faces of the magnet and the size of the coils 15 and 18 are suitably determined in a known manner defined by Gauss and Maxwell, so as to render the fields of the magnet 16—19 and of the coils 15, 18, substantially uniform at least in their central region.

In this region is mounted a small magnet 17 rotatable with an axis 32 which is connected by suitable means, such as articulated levers 30, 31, with the central element 27 of a differential gear mechanism inserted in the control connection between a vertical stabilizing gyroscope 28 and the sensitive element 26 of the follow-up system of the lateral stability control mechanism. More particularly, as shown in the drawings, the above differential gear mechanism is inserted between a sensitive element 26 in the form of a half-disc controlling a pair of orifices 24, 25 of the follow-up mechanism forming part of the lateral stability control means of the aircraft and the outer gimbal ring 29 of the suspension of the vertical stabilizing gyroscope 28, serving as a reference indicator for the lateral stability control mechanism in a manner disclosed in the prior application referred to above.

The small movable magnet 17 adjusts itself in accordance with the direction of the resultant of the field of magnet 16—19 assumed to be invariable and of the field produced by coils 15, 18. As these fields are substantially uniform and perpendicular to each other, the mechanism suggested forms a kind of a tangent compass. By placing coils 3, 6 and 15, 18 in series and by causing the same current $I_2$ pass through the whole circuit, by applying a necessary voltage to the terminals 13 and 14, the small magnet 17 adapted to actuate the differential gear mechanism in the lateral stability control will be rotated by an angle $a$ such as:

$$a = \text{arc-tg } K'I_2 \qquad (3)$$

It will be apparent therefore that provided the other elements of the automatic pilot system will make the variation of heading of the craft accurately dependent on the movements of the sensitive element 10 of the follow-up system controlled by the directional gyroscope 5 and the lateral inclination or bank of the craft accurately dependent on the movements of the sensitive element 26 controlled through the differential gear mechanism 27 by the magnet 17, the movements of the aircraft will be in agreement with Formulas 2 and 3 from which may be extracted the original Equation 1:

$$tg\ a = \frac{wv}{g}$$

The latter shows that the turn upon a change in heading imposed upon the craft by the application of current $I_2$ will be effected with a correct bank angle avoiding any sliding or skidding, provided the parameters of Equations 2 and 3 are correctly chosen.

In order to make the adaptation of such an automatic pilot device easier to any desired conditions, it is advisable to make one of these parameters adjustable, which according to the invention, may be obtained either by acting on the integrating device, i. e. the directional gyroscope, or on the galvanometric device. Thus for instance, in the first case this may be done by acting on the intensity of current passing through the coils 4, or by varying the speed of rotation of the gyro-rotor 5 and in the second case, by replacing the magnet 16—19 in the arc-tangent computing device by an electromagnet.

Furthermore, in accordance with the invention, it is suggested to provide in addition to the above adjustment a manual or automatic adjustment of these parameters in response to the speed $v$ of the craft on its trajectory, which may be produced for instance, with the aid of a variable resistance inserted in the circuit and controlled by an apparatus measuring the aerodynamical speed of the craft. Structure wherein the aerodynamical speed of a craft operates to vary a resistor of this type is well known in the art and for further specific details thereof reference may be had to the patent issued to Eduard Fischel, 2,137,974.

Figure 2:
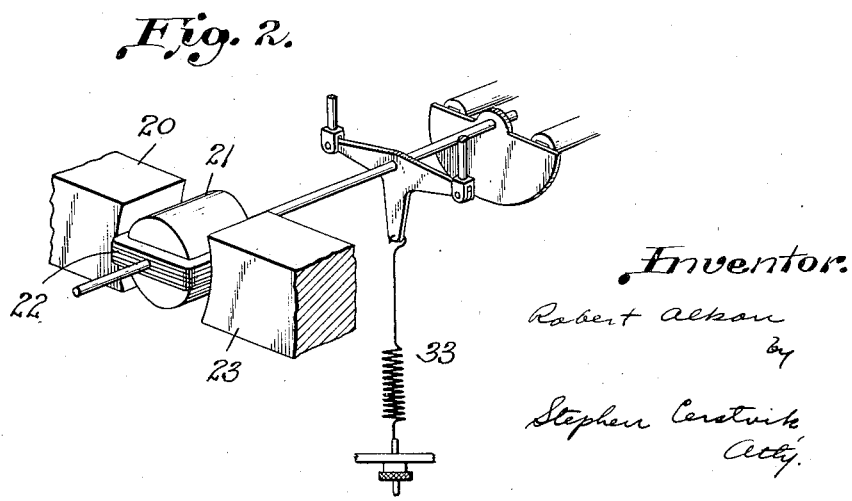
Figure 2 is a detail modification of the embodiment of Figure 1.

In accordance with a further desirable feature of the invention, the same result as obtained with the above described galvanometer of tangents can be insured by providing a moving coil galvanometer with a moving coil 22, Fig. 2, restrained in one direction by a spring 33 and in which the curvatures of the pole pieces 20, 23 for a greater radius of curvature than the core 21. With such a device having an airgap of variable spread around the axis 24, it is possible to use the resulting variation of the field and of the restoring torque with the angle of deflection of the coil, to make the deflection dependent on the intensity of current according to a desired law and namely that of arc-tangent.

Figure 3:
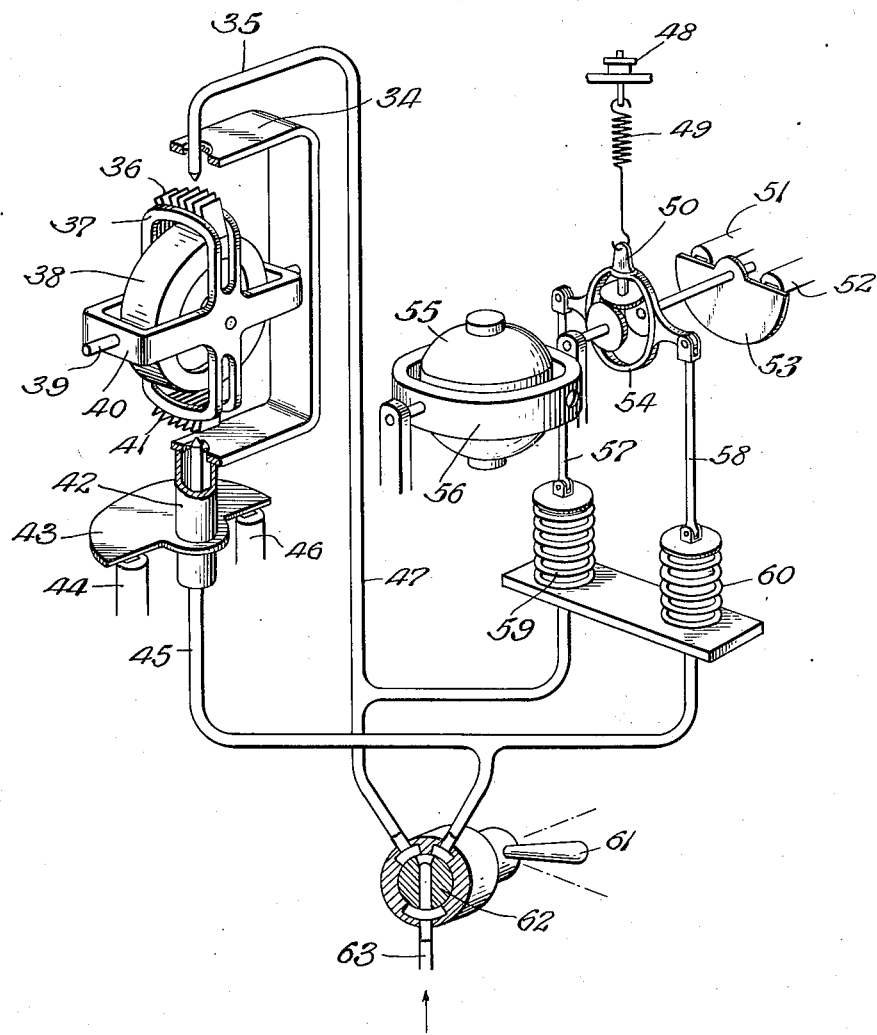
Figure 3 is another embodiment of the invention based on fluid pressure operation.

It is sometimes preferable to use a fluid pressure system in place of the electrical system and Fig. 3 of the drawings shows an embodiment of the invention using fluid pressure for operation. In this embodiment the precession of the gyroscope 38 may be produced by a known method making use of fluid pressure operated pistons reacting on the horizontal gimbal ring 40 of the gyroscope, or else by means of two nozzles 35, 45 coaxial with the vertical axis of rotation of the outer gimbal ring 34 of the gyro-suspension and directing airjets following said axis against two series of blades 36, 41 arranged following two arcs of a circle concentric to the horizontal axis 39 of the internal gimbal ring 40 of the gyro-suspension. The blades 36, 41 are carried by a vertical frame 37 made integral or fixed to said inner gimbal ring 40 of the gyroscope 38. The air pressure exerted on blades 36—41 gives rise to a torque about the axis 39 which torque changes its direction in accordance to whether the nozzle 35 or nozzle 45 is operative. The intensity of this torque is variable with the quantity of compressed air or other pressure medium directed to one or the other of the two nozzles and these variations can be easily produced by means of a three-way graduating valve. The latter valve receives air under pressure by way of a single tube 63 and the internal valve member 62 rotatable by a handle 61, serves to control the turn of the craft.

The reaction torques about the axis 39 produce precessional movements of the gyroscope about the axis 35, 45 which are proportional to said reaction torques and may be integrated in functions of time.

On the conduits 45', 47 connecting the two nozzles 35, 45 with the control cock 61 are branched expansible elements 59, 60 which may be constituted by means such as bellows, capsules, or cylinders with pistons. The elements 59 and 60 are connected by connecting rods 57, 58 to a rocking lever 54 forming the middle or planetary part of a differential gear mechanism 54' which is inserted, as previously explained, between a sensitive element 53 of a follow-up mechanism of the lateral stability control device and the gyro-vertical 55, 56 giving a direction or position of reference for said device.

By providing the rocking lever 54 with an auxiliary arm 50, connected by suitable means to a resistant spring 49 adjustable by means of a button 48, a manometric system is provided the deviations of which are responsive to the pressure applied simultaneously to one of the nozzles 35, 45 and the corresponding expansible element 59 or 60.

By making rods 57 and 58 connecting the expansible element 59, 60 to the rocking lever 54, and the string 49' connecting the resistant spring 49 to said lever, of a sufficient length with respect to the size of the rocking lever, so that for the first approximation the terms of the second power, resulting from the inclinations of these rods, can be neglected, the angle of rotation of the rocking lever 54 will be such that its tangent will be substantially proportional to the value of the pressure of air in the conduit leading to the nozzle in operation, which pressure itself is proportional to the reaction produced by the precession of the gyroscope 38. Thus the preceding equation is again checked and if the follow-up mechanisms controlled respectively by orifices 44, 46 and 51, 52, are capable of causing the aircraft to accurately follow the control movements of the sensitive elements 43 and 53 of said follow-up mechanisms, the turning movements of the craft will be again performed automatically with a correct banking angle preventing any skidding and slipping.

In the same way as it has been proposed in the electrically operated device, it is proposed in this case to provide an adjustment for at least one of the parameters of the device, which may be obtained for instance, by actuating manually or automatically the adjustment button 48 for the tension of the spring 49, in accordance with the value of the airspeed $v$ of the craft on its trajectory.

In automatic pilot devices of the type disclosed in the applicant's prior application referred to above and also dealt with in the present application, in which the adjustment of control mechanisms is performed through the intermediary of differential gear mechanism inserted between the controlling gyroscopes and the sensitive elements of the follow-up systems, difficulties have been encountered in that the sensitive element of a follow-up system, if not disconnected from its corresponding gyroscope after a predetermined angle of rotation, could produce a reversal of the corresponding control. In order to obviate these difficulties, the invention provides improved means permitting the disconnection of the sensitive element of the follow-up mechanism from the gyroscope associated therewith.

Figure 4:
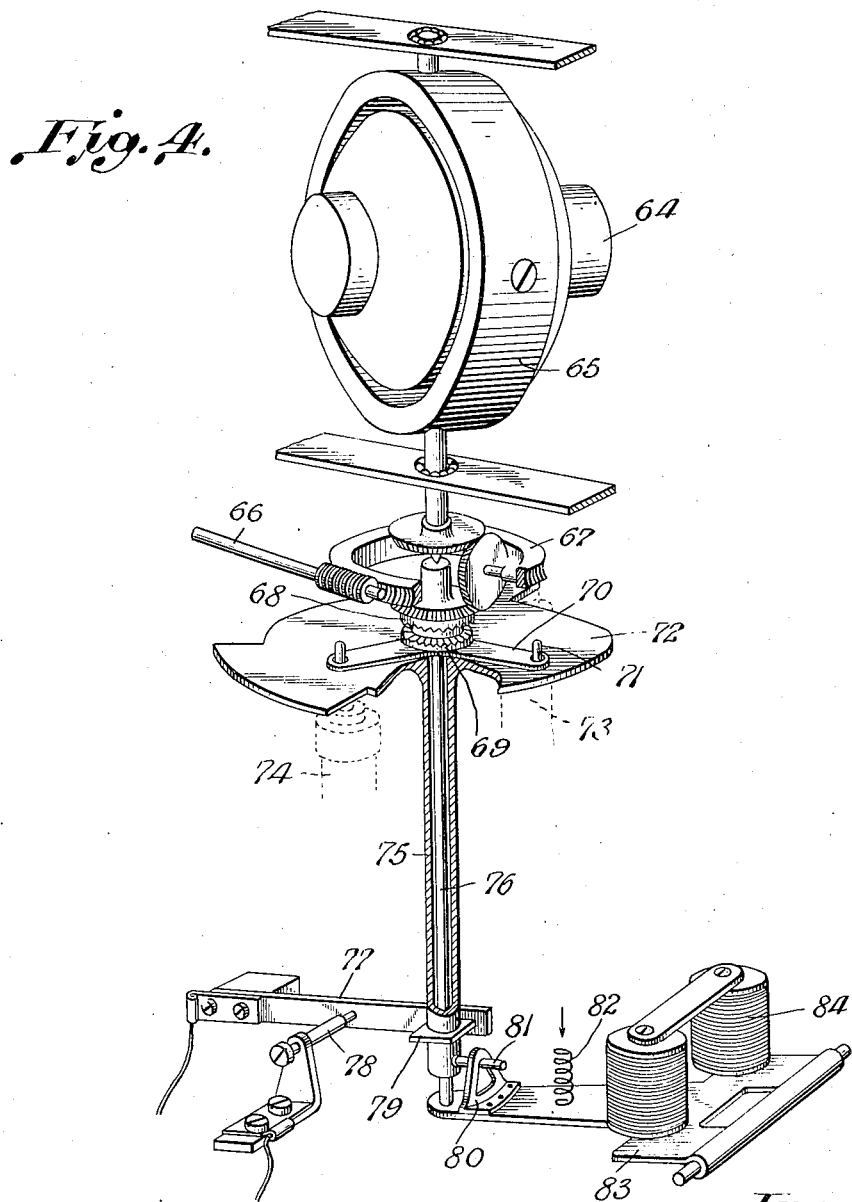
Figure 4 is a diagrammatic view showing the improved connecting arrangement according to the invention provided between a controlling gyroscope and the sensitive element of a follow-up system controlled thereby.

As shown in Fig. 4 of the drawings, there is provided between the outer gimbal ring 65 of a directional gyroscope 64 and the sensitive element 72 of the follow-up mechanism controlled thereby, which sensitive element moves in immediate proximity of two air-nozzles 72 and 73, as it has been explained in the prior application, a declutching mechanism constituted by two opposite crown gears 68, 69, one of which is secured to the gimbal ring 65 either directly or, as indicated in the drawings, through the intermediary of a differential gear mechanism 67 permitting the adjustment of the control manually in case of the directional control and automatically, in case of the lateral or longitudinal controls. The other crown gear 69 is secured to the sensitive element 62 by means of three fingers 71 slidably receiving three orificed arms of a trigger 70 made integral with or secured to the crown gear 69. This crown gear and its trigger are fixed on a shaft 76 sliding within a hollow shaft 75 and the lower extremity of which is actuated by a rocking plate 83 operated by an electromagnet 84. The trigger 70 and the fingers 71 form together a device similar to a clows, but the smoothness of operation and the precision of guiding of which are increased by the relative size of the radius of the driving members. It will be seen that when the electromagnet 84 is energized, the plate 83 exerts an upward thrust on the lower extremity of the shaft 76, whereby the latter is lifted within the hollow shaft 75 and brings into engagement the two crown gears 68, 69. As soon as the energizing current is cut off, a restoring spring 82 produces automatically a disengagement of the crown gears 68, 69.

In accordance with a further feature of the invention it is suggested to control this declutching mechanism automatically, for example, when the displacement of the follow-up nozzles 73, 74 is limited by the construction of the device supporting the same, which happens in particular when this device is controlled by bellows, pistons, or expansible capsules.

In accordance with the invention, an automatic operation of the declutching mechanism 68—69 is produced at the instant when the displacement of the nozzles 73, 74 approaches the limits of their possible movement. This may be obtained by providing the hollow shaft 75, which is rigidly secured to or is made integral with the control element 72, with a cam 79, which is arranged to bear against a plate spring 77 forming together with a stationary contact finger 78, a contact breaker of the circuit (not shown) energizing the electromagnet 84. Thus, it will be seen that if the electromagnet 84 is energized by a circuit including the contact breaker 77, 78, the declutching mechanism 68, 69 will be automatically operated when the deviation of the controlling element 72 reaches a predetermined limit adjustable by means of the contact finger 78.

In accordance with the invention, means are also provided to bring the sensitive or controlling element 72 to its central position when this element is disengaged from the gyroscope. This may be obtained by providing the hollow shaft 75, supporting this element, with a finger 81 extending perpendicularly from said shaft at its lower end and by causing this finger to cooperate with a cam member 80 carried by the plate 83 and having a triangularly-shaped opening receiving this finger. When the plate 83 is lowered down upon the operation of the declutching mechanism, the cam member 80 causes rotation of the finger 81 towards the position corresponding to the central position of the control element 72 defined by the position of the top of the triangular opening in said cam member 80.

The provision of the above described means presents the advantage to render the reversal of the control impossible which may otherwise occur as a result of the reversal of the relative position of the sensitive or controlling element 72 and the nozzles 73, 74 of the follow-up device controlled thereby.

Although several embodiments of the invention have been illustrated and described in detail, it is to be expressly understood that the invention is not limited thereto. Various changes may be made in the design and arrangement of parts without departing from the spirit and scope of the invention as the same will now be understood by those skilled in the art. For a definition of the limits of the invention, reference will be had primarily to the appended claims.

What I claim is:

1. In an aircraft rudder and aileron control system having a servo-motor for actuating the rudder of the aircraft, and a second servo-motor for actuating the ailerons of said aircraft, the combination of a directional gyroscope, means for producing a torque on said gyroscope to cause precession thereof in azimuth, means responsive to the precession of said gyroscope for controlling the rudder servo-motor to actuate the rudder at a rate corresponding to the rate of precession of said gyroscope whereby the aircraft is caused to turn in azimuth, and means effective upon operation of said torque producing means for simultaneously controlling the aileron servo-motor in proportion to the torque produced on said gyroscope to actuate the ailerons to automatically bank the aircraft at the correct banking angle while turning in azimuth.

2. In an aircraft rudder and aileron control system having a servo-motor for actuating the rudder of the aircraft, and a second servo-motor for actuating the ailerons of said aircraft, the combination of a directional gyroscope, a horizon gyroscope, means for producing a torque on said directional gyroscope to cause precession thereof in azimuth, means responsive to the precession of said directional gyroscope for controlling the rudder servo-motor to actuate the rudder at a rate corresponding to the precession of said directional gyroscope whereby the aircraft is caused to turn in azimuth, means controlled by said horizon gyroscope for controlling the aileron servo-motor to actuate the ailerons to cause the aircraft to bank, and means effective upon operation of said torque producing means for simultaneously and additionally controlling said aileron servo-motor in proportion to the torque produced on said gyroscope to automatically bank the aircraft at the correct banking angle while turning in azimuth.

3. In an automatic aircraft rudder and aileron control system having a servo-motor for actuating the rudder of the aircraft, and a second servo-motor for actuating the ailerons of said aircraft, the combination of a directional gyroscope, means for applying a torque to said gyroscope to cause precession thereof in azimuth, means responsive to the precession of said gyroscope for controlling the rudder servo-motor to actuate the rudder at a rate corresponding to the rate of precession of said gyroscope whereby the aircraft is caused to turn in azimuth, and means dependent on the value and direction of the torque applied to said gyroscope for simultaneously controlling the aileron servo-motor to actuate the ailerons to automatically bank the aircraft at the correct banking angle while turning in azimuth.

4. In an aircraft rudder and aileron control system having a servo-motor for actuating the rudder of the aircraft, and a second servo-motor for actuating the ailerons of said aircraft, the combination of a directional gyroscope, means operable at will for applying a predetermined torque on said gyroscope for causing precession thereof, means responsive to the precession of said gyroscope for controlling the rudder servo-motor to actuate the rudder whereby the aircraft is caused to turn in azimuth, and means responsive to the application of said torque to said gyroscope for simultaneously controlling the aileron servo-motor in proportion to said torque to actuate said ailerons to automatically bank the aircraft at an angle whose tangent is proportional to the rate of turning of the aircraft in azimuth.

5. In an aircraft automatic pilot including a servo-motor for actuating the rudder of the aircraft, and a second servo-motor for actuating the ailerons of the aircraft, the combination of a directional gyroscope, a horizon gyroscope, means for applying a torque to said directional gyroscope to cause precession thereof in azimuth, means responsive to the precession of said directional gyroscope for controlling the rudder servo-motor to actuate the rudder at a rate corresponding to the rate of precession of said directional gyroscope whereby the aircraft is caused to turn in azimuth, means controlled by said horizon gyroscope for controlling the aileron motor to actuate the ailerons to cause the aircraft to bank, and means responsive to the application of the torque to said directional gyroscope for simultaneously and additionally controlling said aileron servo-motor to automatically bank the aircraft at an angle whose tangent is proportional to the rate of turning of the aircraft in azimuth.

6. In an aircraft rudder and aileron control system including means for actuating the rudder of the aircraft, and means for actuating the ailerons of said aircraft, the combination of a directional gyroscope for controlling the rudder actuating means, electrical means for applying a predetermined torque to said gyroscope to cause precession thereof in azimuth whereby the rudder is actuated to cause the aircraft to turn in azimuth, electrical means for controlling the aileron actuating means, and common circuit means for simultaneously energizing said torque applying means and said aileron control means for automatically banking the aircraft at an angle whose tangent is proportional to the rate of turning of the aircraft in azimuth.

7. In an aircraft rudder and aileron control system including rudder actuating means and aileron actuating means, the combination of a directional gyroscope for controlling said rudder actuating means, electro-magnetic means for producing a torque on said gyroscope to cause precession thereof in azimuth whereby the rudder of the aircraft is actuated to turn said aircraft in azimuth, means for energizing said torque producing means, and electro-magnetic means responsive to the energization of said torque producing means for simultaneously controlling the aileron actuating means to actuate the ailerons of said aircraft whereby said aircraft is caused to bank at the correct banking angle while turning in azimuth.

8. In an aircraft rudder and aileron control system including rudder actuating means and aileron actuating means, the combination of a directional gyroscope for controlling said rudder actuating means, a gyro-vertical for controlling said aileron actuating means, fluid pressure means for producing a torque on said gyroscope to cause precession thereof in azimuth whereby the rudder of the aircraft is actuated to turn said aircraft in azimuth, and fluid pressure means responsive to the operation of said torque producing means for simultaneously controlling the aileron actuating means to actuate the ailerons of said aircraft whereby the latter is caused to bank at the correct banking angle while turning in azimuth.

9. In an automatic aircraft rudder and aileron control system including rudder actuating means and aileron actuating means, the combination of a directional gyroscope for controlling said rudder actuating means, fluid pressure means for producing a torque on said gyroscope to cause precession thereof in azimuth whereby the rudder of the aircraft is actuated to turn said aircraft in azimuth, and fluid pressure means responsive to the operation of said torque producing means for simultaneously controlling the aileron actuating means to actuate the ailerons of said aircraft whereby the latter is caused to bank at an angle whose tangent is proportional to the rate of turning in azimuth.

10. In an automatic aircraft rudder and aileron control system including a rudder actuating servo-motor and an aileron actuating servo-motor, the combination of a directional gyroscope for controlling the rudder servo-motor, means for producing a torque on said gyroscope to cause precession thereof in azimuth whereby the rudder of the craft is actuated to cause said craft to turn in azimuth at a rate proportional to the precession of said gyroscope, and means for simultaneously controlling the aileron servo-motor to actuate the ailerons of said aircraft, said aileron servo-motor controlling means comprising means responsive to said torque producing means for deriving a controlling force to actuate said ailerons an amount to cause the aircraft to bank at an angle whose tangent is proportional to the precession of said gyroscope, whereby the aircraft is banked at the correct banking angle while turning in azimuth.

11. In an automatic aircraft rudder and aileron control system including a rudder actuating servo-motor and an aileron actuating servo-motor, the combination of a directional gyroscope, means for producing a torque on said gyroscope to cause precession thereof in azimuth, means responsive to the precession of said gyroscope for controlling said rudder servo-motor to actuate the rudder of the aircraft whereby the latter is caused to turn at a rate proportional to the precession of said gyroscope, a horizon gyroscope, means controlled by said horizon gyroscope for controlling said aileron servo-motor to actuate the ailerons of said aircraft whereby the latter is caused to bank, means responsive to the torque producing means for additionally controlling said aileron servo-motor simultaneously with the actuation of the rudder and in proportion to the precession of said directional gyroscope whereby the ailerons are actuated to bank the aircraft at an angle whose tongent is proportional to the rate of turning of the aircraft in azimuth, and differential connecting means between said horizon gyroscope and said torque responsive controlling means, whereby said aileron servo-motor may be controlled by said horizon gyroscope independently of the torque responsive controlling means.

12. In an automatic pilot for aircraft, the combination with a control surface, of means for actuating said control surface, a directional gyroscope for controlling said actuating means, manually operable means for applying a predetermined torque on said gyroscope for causing precession thereof in azimuth, whereby a controlling action is exerted on said control surface for causing deviation of said craft, and means responsive to the operation of said torque producing means for simultaneously causing automatic banking of the craft at the correct banking angle during such deviation.

13. In an automatic pilot for aircraft, the combination with a control surface, of means for actuating said control surface, a directional gyroscope for controlling said actuating means, automatically operable means responsive to the speed of the craft for applying a predetermined torque on said gyroscope for causing precession thereof in azimuth, whereby a controlling action is exerted on said control surface for causing deviation of said craft, and means responsive to the operation of said torque producing means for simultaneously causing automatic banking of the craft at the correct banking angle during such deviation.

14. In an automatic pilot for aircraft, the combination with a control surface, of means for actuating said control surface, a directional gyroscope for controlling said actuating means, of means for imposing a torque on said gyroscope causing precession thereof and consequent operation of said control surface, and means comprising a de-clutching mechanism interposed between said gyroscope and said actuating means whereby upon energization of the torque producing means said gyroscope and said actuating means are placed in operative relationship, and whereby disengagement results when said torque producing means are de-energized.

ROBERT ALKAN.